United States Patent [19]

Burrows et al.

[11] Patent Number: 5,864,595
[45] Date of Patent: Jan. 26, 1999

[54] ACTUATOR FOR FACILITATING PERFORMANCE OF WORK IN A NUCLEAR REACTOR

[75] Inventors: Brian H. Burrows, Campbell; Neal J. Goldberg, Milpitas; Michael A. Flanigan; Michael Y. Suekawa, both of San Jose, all of Calif.

[73] Assignee: General Electric Company, Schnectady, N.Y.

[21] Appl. No.: 853,280

[22] Filed: May 9, 1997

Related U.S. Application Data

[60] Provisional application No. 60/025,276 Sep. 18, 1996.
[51] Int. Cl.$^6$ ........................................... G21C 19/00
[52] U.S. Cl. ........................... 376/260; 376/249; 414/749; 901/16
[58] Field of Search ..................... 376/249, 260; 901/16; 414/146, 749; 165/11.2

[56] References Cited

U.S. PATENT DOCUMENTS

| | | | |
|---|---|---|---|
| 4,759,674 | 7/1988 | Schroder et al. | 376/260 |
| 5,156,803 | 10/1992 | Engding et al. | 376/249 |
| 5,265,491 | 11/1993 | Nishiumi | 901/16 |
| 5,600,687 | 2/1997 | Welsh | 376/260 |

*Primary Examiner*—Daniel D. Wasil
*Attorney, Agent, or Firm*—Armstrong & Teasdale, Schlafly & Davis

[57] ABSTRACT

An actuator for performing work in a nuclear reactor is described. In one embodiment, the actuator includes an x-axis linear slide assembly, a y-axis linear slide assembly, and a z-axis linear slide assembly. The x-axis linear slide assembly is mounted to a junction box, the y-axis linear slide assembly is mounted on a carriage of the x-axis assembly, and the z-axis linear slide assembly is mounted on a carriage of the y-axis assembly. The actuator also includes motor assemblies coupled to respective linear slide assemblies. Each motor assembly includes a motor and a resolver sealed in a leakproof can. Pulley-timing belt assemblies couple each motor to a respective lead screw. Specifically, a drive pulley is connected to a rotor shaft of each motor, and a lead screw pulley is secured to an end of each lead screw. Each pulley-timing belt assembly also includes an idler pulley, and a belt extends around the lead screw pulley, the idler pulley, and the drive pulley. The motor assemblies are mounted so that the axis of each motor is substantially parallel to the axis the respective lead screw. By mounting motor assemblies in this configuration, the overall dimensions of the actuator are believed to be minimized when each slide assembly is fully retracted. The actuator further includes a delivery system interface for firmly attaching the actuator to a delivery system, and a tool mounting platform attached to the z-axis linear slide assembly. Threaded openings are located on the platform face and are used to secure various attachments to the platform. Many different attachments, such as an ultrasonic inspection unit, a brushing unit, and an electrical discharge machine (EDM) unit, can be secured to the platform.

17 Claims, 3 Drawing Sheets

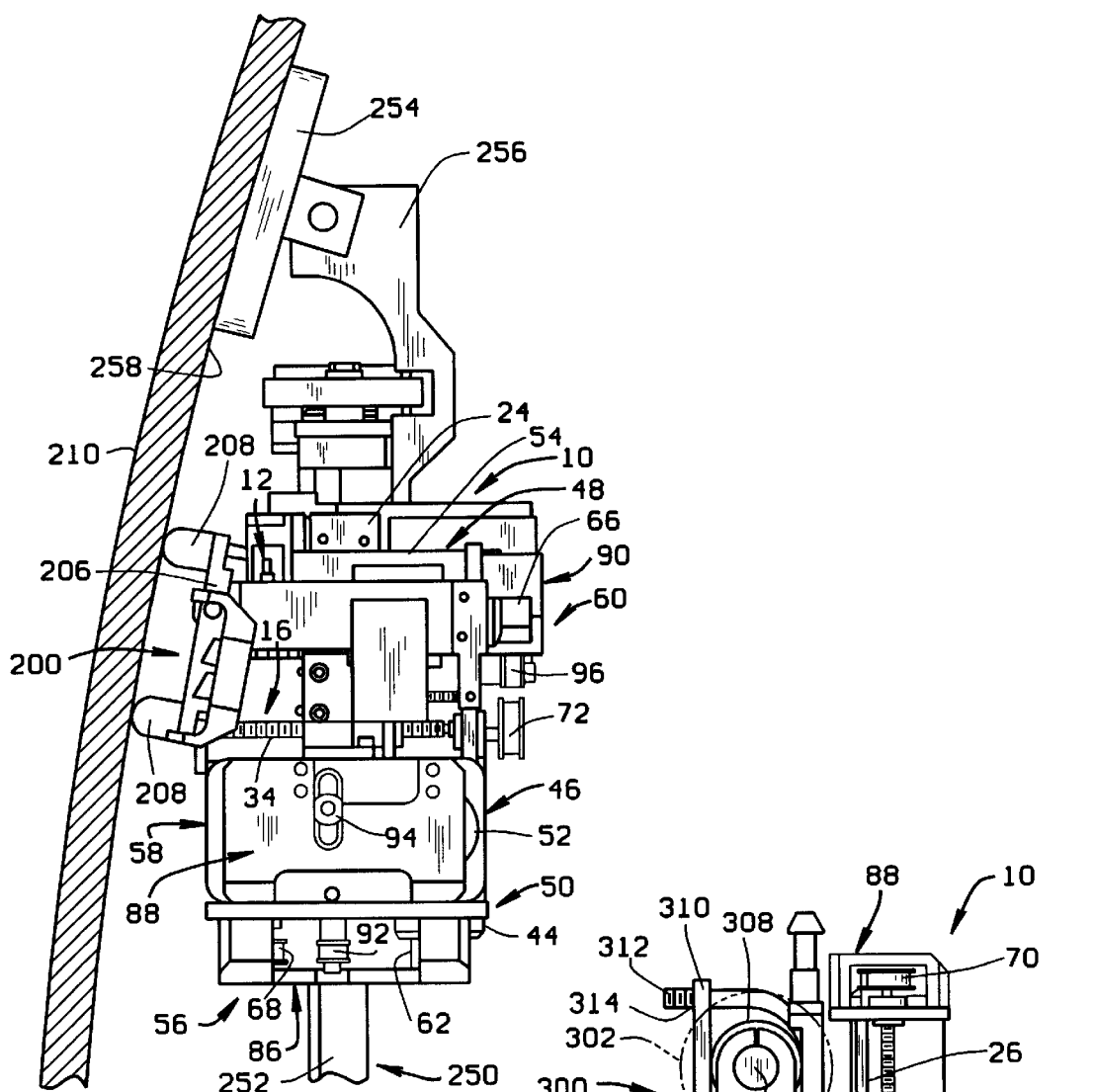
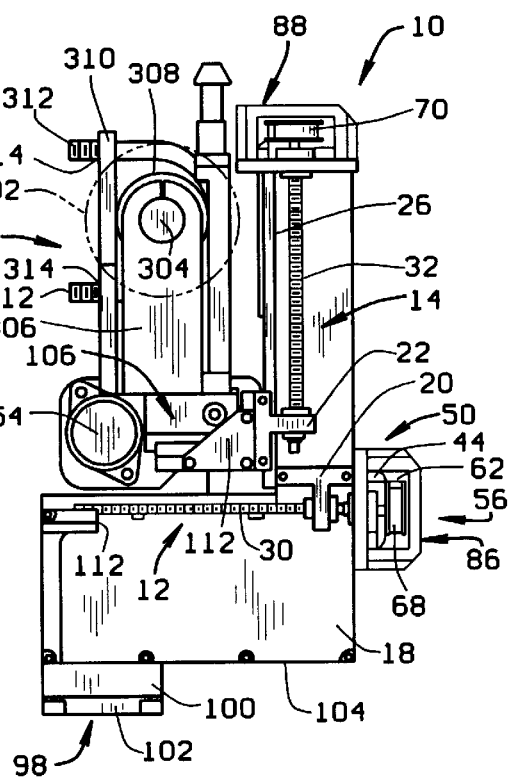
FIG. 5
FIG. 6

ACTUATOR FOR FACILITATING PERFORMANCE OF WORK IN A NUCLEAR REACTOR

This application claims the benefit of U.S. Provisional application Ser. No. 60/025,276, filed Sep. 18, 1996.

FIELD OF THE INVENTION

This invention relates generally to nuclear reactor servicing and, more particularly, to apparatus for performing work on an inner surface of a nuclear reactor core shroud.

Background of the Invention Repairs and inspections performed within the reactor pressure vessel (RPV) of a boiling water reactor (BWR) typically are performed with ropes and poles for manual manipulation of simple tools or manual delivery of dedicated automated tools. More specifically, the RPV typically has a generally cylindrical shape and is closed at both ends, e.g., by a bottom head and a removable top head. A top guide typically is spaced above a core plate within the RPV, and fuel bundles extend from the core plate toward the top guide. A substantially cylindrical shroud extends from the core plate to the top guide, and the fuel bundles are located within the shroud. Many other components, e.g., steam dryers, also are located in the RPV.

During reactor shut down, and if it is desired to inspect or repair certain components within the RPV, the RPV top head is removed. Other components such as the steam dryers may also be removed to enable access to RPV locations between the top guide and core plate. To perform the inspections and repairs, an operator typically stands on a bridge positioned over the RPV and using ropes and poles, which may extend more than thirty (30) feet below the bridge into the RPV, inspects or repairs certain RPV components. The ability to perform such inspections and repairs greatly depends on the dexterity of the operator.

In addition, it is extremely difficult to precisely position a tool within the RPV using ropes and poles. Even if the tool is accurately positioned for one operation in a desired location, it is extremely difficult to then precisely position another tool at the exact same location to perform a next step in the operation. Also, each inspection and repair operation typically requires the design and fabrication of special, dedicated tools. Designing and fabricating tools for each task is costly.

For example, in performing an ultrasonic inspection, brushing, and electrical discharge machining (EDM) on a surface of the shroud, one tool typically is used for the inspection, another tool is used for brushing, and yet another tool is used for the EDM. In operation, the inspection, brushing and EDM tools preferably are moved along a predefined path so that the same shroud surface is inspected, brushed, and machined.

Due to the difficulty in even accessing locations within the RPV, performing repairs and inspections on the shroud can be time consuming. It is desirable, of course, to limit the time required to perform repairs and inspections on the shroud since the reactor must be shut down to perform such tasks. Reducing the amount of time required to perform such inspections and repairs also facilitates reducing the operator radiation exposure per task.

SUMMARY OF THE INVENTION

These and other objects are attained by an actuator which includes an x-axis linear slide assembly, a y-axis linear slide assembly, and a z-axis linear slide assembly. The x-axis linear slide assembly is mounted to a junction box, the y-axis linear slide assembly is mounted on a carriage of the x-axis assembly, and the z-axis linear slide assembly is mounted on a carriage of the y-axis assembly. Each linear slide assembly includes a linear slide and a lead screw.

The actuator also includes motor assemblies coupled to respective linear slide assemblies. Each motor assembly includes a motor and a resolver sealed in a leakproof can. O-rings, self-sealing fasteners, and leakproof tube fittings are used for all necessary penetrations of the cans.

Pulley-timing belt assemblies couple each motor to a respective lead screw. Specifically, a drive pulley is connected to a rotor shaft of each motor, and a lead screw pulley is secured to an end of each lead screw. Each pulley-timing belt assembly also includes an idler pulley, and a belt extends around the lead screw pulley, the idler pulley, and the drive pulley. The motor assemblies are mounted so that the axis of each motor is substantially parallel to the axis the respective lead screw. By mounting motor assemblies in this configuration, the overall dimensions of the actuator are believed to be minimized when each slide assembly is fully retracted.

The actuator further includes a delivery system interface for firmly attaching the actuator to a delivery system. The interface includes a collet, a collet closer, and an eject piston. The collet and collet closer clamp onto a delivery system which includes a stable platform and a vertical pin. Such delivery systems are well known in the art, and one such delivery system is described in U.S. patent application Ser. No. 08/853,768, filed May 9, 1997, which claims the benefit of U.S. Provisional patent application Ser. No. 60/029,334, filed Aug. 22, 1996, and assigned to the present assignee.

The actuator also includes a tool mounting platform attached to the z-axis linear slide assembly. Threaded openings are located on the platform face and are used to secure various attachments to the platform. Many different attachments, such as an ultrasonic inspection unit, a brushing unit, and an electrical discharge machine (EDM) unit, can be secured to the platform.

In operation, the actuator is positioned within the RPV by the delivery system. An operator then controls positioning of the tool by controlling the position of the platform using the linear slide assemblies and the motor assemblies. Alternatively, the position of the platform can be controlled using pre-programmed control software for controlling energization and de-energization of the motors of the motor assemblies. The resolvers for each motor assembly provide data so that the position of the actuator platform can be determined.

The actuator is believed to facilitate access to, and performing work on, portions of the shroud between the top guide and core plate. Using the actuator, the ability to perform such work is less dependent upon the dexterity of the operator, and precise positioning and repositioning of tools is believed to be possible. Further, many different tools can be used in combination with the actuator, which facilitates reducing tooling costs. The actuator also is believed to reduce the amount of time required to perform certain tasks on the shroud and therefore, such actuator is believed to facilitate reducing operator radiation exposure per task.

BRIEF DESCRIPTION OF THE DRAWINGS

FIG. 5 is a top view of the actuator and ultrasound unit performing an inspection on a shroud wall.

FIG. 6 is a side view of the actuator shown in FIG. 1 having a brush unit secured thereto.

DETAILED DESCRIPTION OF THE DRAWINGS

Figure 1:
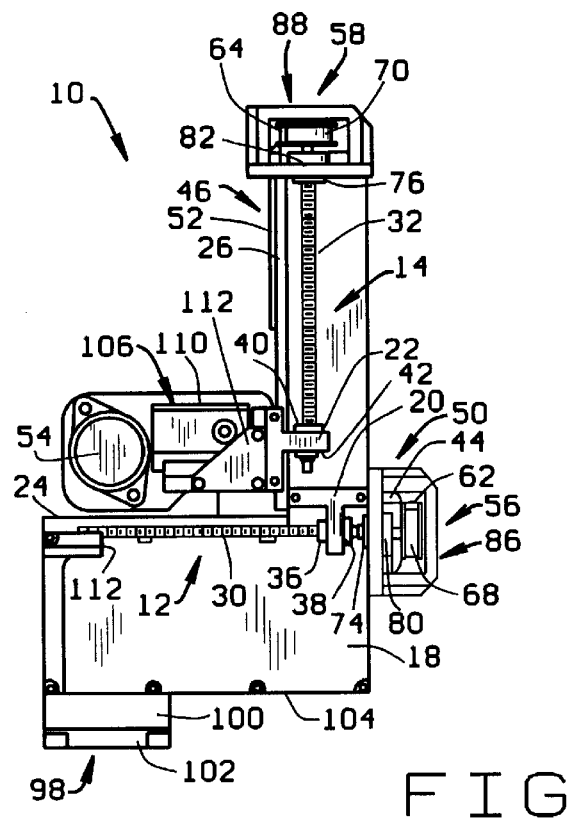
FIG. 1 is a front view of an actuator in accordance with one embodiment of the present invention.
Figure 2:
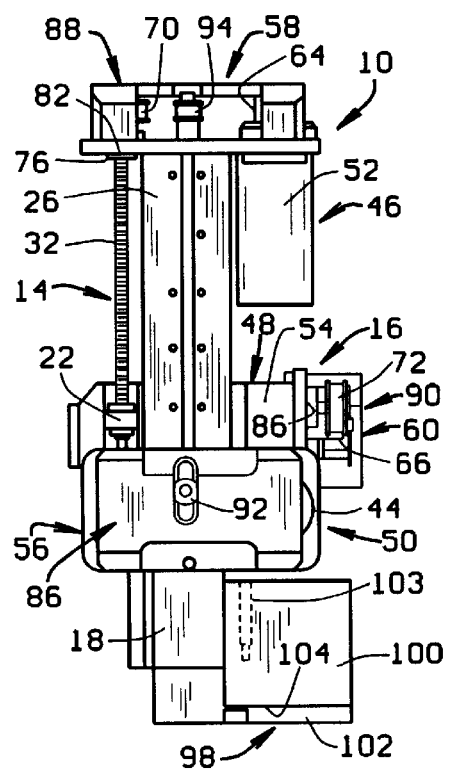
FIG. 2 is a side view of the actuator shown in FIG. 1.
Figure 3:
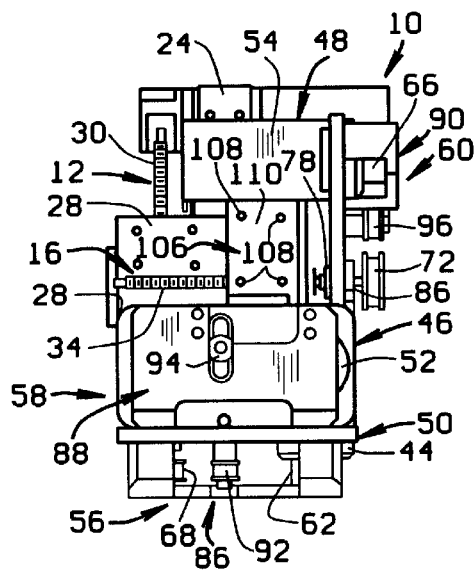
FIG. 3 is a top view of the actuator shown in FIG. 1.

FIGS. 1, 2, and 3 are front, side and top views, respectively, of an actuator 10 in accordance with one embodiment of the present invention. Generally, actuator 10 is configured so that it can be inserted through an opening in a top guide of a nuclear reactor and positioned between the top guide and the core plate to perform work on the reactor shroud. Actuator 10 also is configured to function reliably underwater for extended periods of time at depths of approximately sixty five feet and can accommodate a number of interchangeable attachments with minimal modification. Actuator 10 is further configured to function in a high radiation environment for extended periods of time.

Referring to FIGS. 1, 2, and 3, actuator 10 includes an x-axis linear slide assembly 12, a y-axis linear slide assembly 14, and a z-axis linear slide assembly 16. Linear slide assemblies 12 and 14 for the x-axis and the y-axis provide approximately about six (6) inches of travel, and linear slide assembly 16 for the z-axis provides approximately about three (3) inches of travel. By allowing such travel in the x, y, and z axes, actuator 10 can cover approximately about thirty six (36) square inches of shroud surface in a single setting. X-axis linear slide assembly 12 is mounted to a junction box 18. Y-axis linear slide assembly 14 is mounted on a carriage 20 of x-axis assembly 12, and z-axis linear slide assembly 16 is mounted on a carriage 22 of y-axis assembly 14. Each linear slide assembly 12, 14 and 16 includes a linear slide 24, 26 and 28 and a lead screw 30, 32 and 34. X-axis lead screw 30 extends through a bearing 36 positioned in an opening 38 in carriage 20. Y-axis lead screw 32 extends through a bearing 40 positioned in an opening 42 in carriage 22.

Motor assemblies 44, 46 and 48 are coupled to respective linear slide assemblies 12, 14 and 16. Specifically, each motor assembly 44, 46 and 48 includes a motor which in one embodiment is a 100W compact stepper motor, and a resolver (the motors and resolvers are not shown). Each motor and resolver are sealed in a respective leakproof cans 50, 52 and 54. O-rings, self-sealing fasteners, and leakproof tube fittings are used for all necessary penetration of cans.

Pulley-timing belt assemblies 56, 58 and 60 couple to respective motors to respective lead screws 30, 32 and 34. Specifically, drive pullies 62, 64 and 66 are connected to rotor shafts (not shown) of each motor. Lead screw pullies 68, 70 and 72 are secured to ends of respective lead screws 30, 32 and 34. Specifically, lead screws 30, 32 and 34 extends through respective bearings located in openings 80, 82 and 84 in respective protective covers 86, 88 and 90, and are secured to respective lead screw pullies 68, 70 and 72. Idler pullies also are positioned within, and secured to respective covers 86, 88 and 90. Belts 66 extend around lead screw pullies 68, 70 and 72, idler pullies 92, 94 and 96, and drive pullies 62, 64 and 66. Protective covers 86, 88 and 90 facilitate preventing damage to pulley-timing belt assemblies 56, 58 and 60 during tool installation and removal, as well as to prevent foreign objects from interfering with normal operation of actuator 10.

Motor assemblies 44, 46 and 48 are mounted so that the axis of each motor is substantially parallel to the axis of its respective lead screw 30, 32 and 34. By mounting motor assemblies 44, 46 and 48 in this configuration, the overall dimensions of actuator are believed to be minimized when each slide assembly 12, 14 and 16 is fully retracted. The motors are energized by power supplied through junction box 16 from an external power source.

Actuator 10 further includes a delivery system interface 98 for firmly attaching actuator 10 to a delivery system (not shown in FIGS. 2 and 3). Interface 98 includes a collet closer 100, a collet 102, and an eject piston 103. Collet closer 100 and collet 102 can clamp onto a delivery system which includes a stable platform and a vertical pin, e.g., an approximately one inch diameter vertical pin. Such delivery systems are well known in the art. In one embodiment, collet 102 is compact, square, and hydraulically driven and mounted on a base 104 of junction box 18. The eject piston is a miniature threaded cylinder mounted on an inside of collet closer 100. The eject piston operates to push actuator 10 off the delivery system pin and is coupled into the hydraulic line which opens collet closer 100.

Actuator 10 also includes tool mounting platform 106 attached to z-axis linear slide assembly 16. Threaded openings 108 are located in platform face 110 and are used to secure various attachments to platform 106. Many different attachments, such as an ultrasonic inspection unit, a brushing unit, and an electrical discharge machine (EDM) unit can be secured to platform 106. Mechanical stops 112 are provided to limit movement of platform 106.

Linear slide assemblies 12, 14 and 16, motor cans 50, 52 and 54, pulleys 62, 64, 66, 68, 70, 72, 92, 94 and 96, delivery system interface 98, and tool mounting platform 106 can be aluminum or stainless steel, for example. By using stainless steel for such components, actuator 10 can function reliably underwater for extended periods of time at depths of approximately sixty five feet. In addition, actuator 10 can function in a high radiation environment for extended periods of time.

Figure 4:
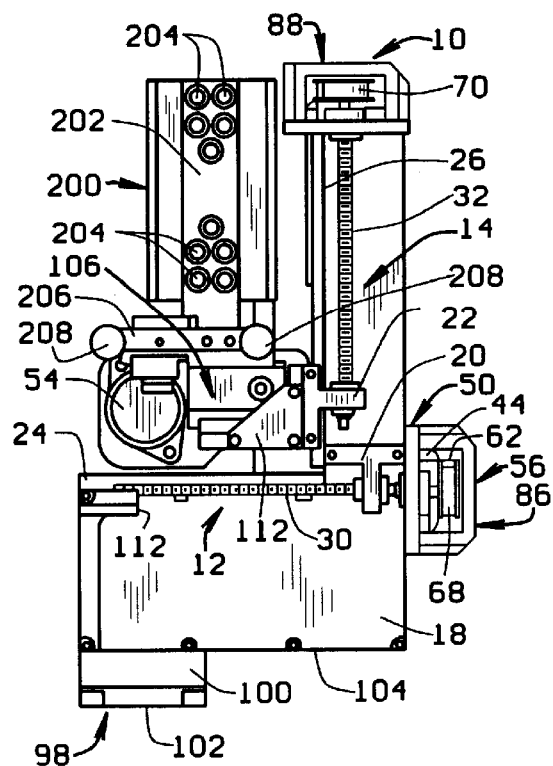
FIG. 4 is a side view of the actuator shown in FIG. 1 having an ultrasound unit secured thereto.

For example, FIG. 4 is a side view of actuator 10 having an ultrasound unit 200 secured thereto. Ultrasound unit includes a housing 202 and immersion transducers 204 extending from housing 202. Transducers 204 are oriented to enable ultrasonically inspecting above and below the centerline of shroud welds. Unit 200 further includes a rail 206 mounted to housing 202, and polyethylene standoffs 208 are secured at opposing ends of rail 206.

FIG. 5 is a top view of actuator 10 and ultrasound unit 200 performing an inspection on a shroud wall 210. As shown in FIG. 5, actuator 10 is mounted to a delivery system 250 including a rail 252 and a suction cup 254 secured to one end 256 of rail 252. Suction cup 254 is secured to an inner surface 258 of shroud wall 210 and provides stability. Polyethylene standoffs 208 of ultrasound unit 200 make contact with shroud wall 210 during an examination. Such standoffs 208 facilitate maintaining the necessary water path distance between transducers 204 and shroud wall 208. Alternatively, z-axis linear slide assembly 16 can be programmed to remain at a fixed distance from shroud wall 210 as tool mounting platform 106 is moved in the x-direction.

In operation, actuator 10 is positioned within the RPV by delivery system 250. An operator then controls the position of unit 200 by controlling the position of platform 106 using linear slide assemblies 12, 14 and 16 and motor assemblies 44, 46 and 48. Alternatively, the position of platform 106 can be controlled using pre-programmed control software for controlling energization and de-energization of the motors of motor assemblies 44, 46 and 48. The resolvers for each motor assembly 44, 46 and 48 provide data so that the position of actuator platform 106 can be determined.

FIG. 6 is a side view of actuator 10 having a brush unit 300 secured thereto. Brush unit 300 includes a nylon brush 302 mounted on a rotor 304 supported by arms 306. An in-line starter motor 308 is utilized to rotate brush 302. Power is supplied to motor 308 via an external power source. The external power source could, for example, be a variable DC power supply. Brush unit 300 further includes a support 310, and a u-bolt 312 extend through openings 314 and secures motor 08 to support 310.

Ultrasound inspection unit 200 and brush unit 300 are illustrated herein by way of example only. It is contemplated that many other tools for performing other functions, and other configurations of ultrasound and brush units, could be used in connection with actuator 10. In addition, it should be understood that the present invention is directed to actuator 10, and that ultrasound and brush units 200 and 300 are exemplary units only.

The above described actuator is believed to facilitate access to, and performing work on, portions of the shroud between the top guide and core plate. Using the above described actuator, the ability to perform such work is less dependent upon the dexterity of the operator, and precise positioning and repositioning of tools is believed to be possible. Further, many different tools can be used in combination with the actuator, which facilitates reducing tooling costs. Further, the actuator is believed to reduce the amount of time required to perform certain tasks on the shroud and therefore, such actuator is believed to facilitate reducing operator radiation exposure per task.

From the preceding description of the present invention, it is evident that the objects of the invention are attained. Although the invention has been described and illustrated in detail, it is to be clearly understood that the same is intended by way of illustration and example only and is not be taken by way of limitation. Accordingly, the spirit and scope of the invention are to be limited only by the terms of the appended claims.

What is claimed is:

1. Apparatus for use in a nuclear reactor including a top guide and a substantially cylindrical shroud, the top guide having a plurality of openings extending therethrough and being substantially cylindrical, a delivery system configured to extend through at least one of the openings in the top guide to deliver a tool within the reactor, said apparatus configured to be inserted into the reactor through an opening in the top guide, said apparatus comprising:
   a plurality of linear slide assemblies comprising an x-axis linear slide assembly, a y-axis linear slide assembly coupled to said x-axis linear slide assembly, and a z-axis linear slide assembly coupled to said y-axis linear slide assembly;
   a plurality of motor assemblies, each of said motor assemblies coupled to one of said linear slide assemblies;
   a delivery system interface for coupling to the delivery system; and
   a tool mounting platform coupled to one of said linear slide assemblies, said tool mounting platform configured to couple to the tool.

2. Apparatus in accordance with claim 1 wherein each of said linear slide assemblies comprises a lead screw, and said x-axis lead screw is coupled to a first carriage and said y-axis lead screw is coupled to a second carriage.

3. Apparatus in accordance with claim 2 further comprising a junction box, and said x-axis linear slide assembly is mounted to said junction box, said y-axis linear slide assembly is mounted to said first carriage, and said z-axis linear slide assembly is mounted to said second carriage.

4. Apparatus in accordance with claim 1 wherein each of said motor assemblies comprises a motor and a resolver located within a leakproof can, said resolver coupled to said motor.

5. Apparatus in accordance with claim 4 wherein said linear slide assemblies comprise an x-axis linear slide assembly, a y-axis linear slide assembly, and a z-axis linear slide assembly, each of said linear slide assemblies comprising a lead screw, and said motor assemblies comprise a first motor assembly coupled to said x-axis linear slide assembly, a second motor assembly coupled to said y-axis linear slide assembly, and a third motor assembly coupled to said z-axis linear slide assembly.

6. Apparatus in accordance with claim 4 further comprising a plurality of pulley assemblies, each of said pulley assemblies comprising a lead screw pulley secured to each of said lead screws, and a drive pulley secured to a rotor shaft of each of said motors.

7. Apparatus in accordance with claim 1 wherein said delivery system interface comprises a collet, a collet closer clamp, and an eject piston, said collet closer clamp configured to be removably clamped to a vertical pin of the delivery system.

8. Apparatus in accordance with claim 1 wherein said platform is coupled to said z-axis linear slide assembly and is configured to couple to a plurality of tools.

9. An actuator for facilitating the performance of work in a nuclear reactor, the nuclear reactor including a top guide having a plurality of openings extending therethrough and being substantially cylindrical, a delivery system configured to couple to the actuator and extend through the top guide to deliver a tool within the reactor, said actuator configured to be inserted into the reactor through an opening in the top guide said actuator comprising:
   linear slide assemblies comprising an x-axis linear slide assembly, a y-axis linear slide assembly, and a z-axis linear slide assembly, each of said linear slide assemblies comprising a lead screw, and said x-axis lead screw is coupled to a first carriage and said y-axis lead screw is coupled to a second carriage;
   a plurality of motor assemblies comprising a first motor assembly coupled to said x-axis linear slide assembly, a second motor assembly coupled to said y-axis linear slide assembly, and a third motor assembly coupled to said z-axis linear slide assembly;
   a delivery system interface for coupling to the delivery system; and
   a tool mounting platform coupled to one of said linear slide assemblies, said tool mounting platform configured to couple to the tool.

10. An actuator in accordance with claim 9 further comprising a junction box, and said x-axis linear slide assembly is mounted to said junction box, said y-axis linear slide assembly is mounted to said first carriage, and said z-axis linear slide assembly is mounted to said second carriage.

11. An actuator in accordance with claim 9 wherein each of said motor assemblies comprise a motor and a resolver located within a leakproof can.

12. An actuator in accordance with claim 11 further comprising a plurality of pulley assemblies, each of said pulley assemblies comprising a lead screw pulley secured to each of said lead screws, and a drive pulley secured to a rotor shaft of each of said motors.

13. An actuator in accordance with claim 10 wherein said delivery system interface comprises a collet, a collet closer clamp, and an eject piston, said collet closer clamp configured to be removably clamped to a vertical pin of the delivery system.

14. An actuator in accordance with claim 10 wherein said platform is coupled to said z-axis linear slide assembly and is configured to couple to a plurality of tools.

15. An actuator for facilitating the performance of work on a shroud of a nuclear reactor, the nuclear reactor including a top guide having a plurality of openings extending therethrough and being substantially cylindrical, a delivery system configured to couple to the actuator and extend through the top guide, said actuator configured to be inserted into the reactor through an opening in the top guide said actuator comprising:

linear slide assemblies comprising an x-axis linear slide assembly, a y-axis linear slide assembly, and a z-axis linear slide assembly, each of said linear slide assemblies comprising a lead screw, said x-axis lead screw coupled to a first carriage and said y-axis lead screw coupled to a second carriage;

a plurality of motor assemblies comprising a first motor assembly coupled to said x-axis linear slide assembly, a second motor assembly coupled to said y-axis linear slide assembly, and a third motor assembly coupled to said z-axis linear slide assembly, each of said motor assemblies comprising a motor and a resolver located within a leakproof can;

a plurality of pulley assemblies, each of said pulley assemblies comprising a lead screw pulley secured to each of said lead screws, and a drive pulley secured to a rotor shaft of each of said motors a delivery system interface for coupling to the delivery system; and a tool mounting platform coupled to said z-axis linear slide assembly and configured to couple to a plurality of tools.

16. An actuator in accordance with claim 15 further comprising a junction box, and said x-axis linear slide assembly is mounted to said junction box, said y-axis linear slide assembly is mounted to said first carriage, and said z-axis linear slide assembly is mounted to said third carriage.

17. An actuator in accordance with claim 15 wherein said delivery system interface comprises a collet, a collet closer clamp, and an eject piston, said collet closer clamp configured to be removably clamped to a vertical pin of the delivery system.

\* \* \* \* \*